United States Patent [19]

Kreft

[11] Patent Number: 4,492,566
[45] Date of Patent: Jan. 8, 1985

[54] METHOD AND APPARATUS FOR HEAT TREATMENT OF FINE-GRAINED MATERIAL

[75] Inventor: Wilfried Kreft, Ennigerloh, Fed. Rep. of Germany

[73] Assignee: Krupp Polysius AG, Beckum, Fed. Rep. of Germany

[21] Appl. No.: 477,066

[22] Filed: Mar. 21, 1983

[30] Foreign Application Priority Data

Mar. 31, 1982 [DE] Fed. Rep. of Germany ....... 3212009

[51] Int. Cl.³ .......................... C04B 7/02; F27B 15/00; F27B 7/02
[52] U.S. Cl. ...................................... 432/14; 106/100; 432/106
[58] Field of Search ................... 432/14, 106; 106/100

[56] References Cited

U.S. PATENT DOCUMENTS 4,363,668  12/1982  Herchenbach .................. 432/14
4,402,667   9/1983  Goldmann ....................... 432/14

Primary Examiner—John J. Camby
Attorney, Agent, or Firm—Learman & McCulloch

[57] ABSTRACT

Fine-grained material such as raw cement meal is preheated in a multi-stage cyclone preheater, precalcined in a precalcination zone, sintered in a rotary kiln, and cooled in a cooler. Exhaust gases from the kiln are delivered to the precalcining zone and then to the preheater. Tertiary air from the cooler is divided into two streams one of which is mixed with kiln exhaust gases between the kiln and the precalciner and the other of which is delivered directly to the precalciner. The quantity of tertiary air flowing through each branch is regulated to maintain the temperature of the kiln exhaust gases at a selected value.

15 Claims, 4 Drawing Figures

METHOD AND APPARATUS FOR HEAT TREATMENT OF FINE-GRAINED MATERIAL

BACKGROUND OF THE INVENTION

The invention relates to a method of heat treatment of fine-grained material, such as cement, using a rotary kiln as a combustion zone, a preheating zone for preheating the material with the exhaust gases from the rotary kiln, and a calcination zone arranged between the preheating zone and the combustion zone to which further combustion material is delivered in addition to the exhaust gases from the kiln, tertiary air from a cooling zone being mixed together with the exhaust gases from the kiln immediately after they leave the rotary kiln. The invention also relates to apparatus for carrying out this method.

In processes of the aforesaid type it has proved advantageous from the point of view of planning both the process and the plant to provide a special calcination zone between the rotary kiln and the preheating zone, because in this way the greater part of the calcination treatment of the material can be carried out upstream from the rotary kiln so that the rotary kiln is relieved of strain pyrometrically and can be shorter in length as compared with other known processes in which a substantial proportion of the calcination takes place inside the rotary kiln. However, in shortened rotary kilns numerous problems occur because in the transition region from the rotary kiln to the heat exchanger or to the calcination zone the exhaust gases from the kiln are still at relatively high temperatures so that amongst other things undesirable deposits can build up in this transition region.

A method of the type referred to above has been proposed (DD-PS 51 795) in which the tertiary air coming from a cooler is led directly into the inlet chamber provided at the material inlet end of the rotary kiln so that the exhaust gases escaping from the rotary kiln are mixed together with the cooler tertiary air. However, in this method the cooling of the exhaust gases from the rotary kiln is so drastic that the combustion of the material in the calcination zone is markedly impaired.

SUMMARY OF THE INVENTION

An object of the invention is to provide a method of the type referred to above (as well as apparatus suitable for carrying out the method) in which a relatively short rotary kiln may be used while ensuring both the desired cooling of the exhaust gases from the rotary kiln and an economical combustion of the material delivered to the calcination zone.

This object is achieved according to the invention in that the tertiary air is divided into two streams of which the first stream is mixed together with the kiln exhaust gases immediately after they escape from the rotary kiln, while the second stream is led directly to the calcination zone, the first stream being regulated so that by mixing this stream with the kiln exhaust gases the mixed gas temperature of approximately 1000° C. is set.

The division of the tertiary air according to the invention permits cooling of the hot exhaust gases coming from the rotary kiln to a value (approximately 1000° C.) at which it is practically impossible for undesirable deposits to build up in pipes and parts of the apparatus between the rotary kiln and the calcination zone, but at the same time the temperature of the kiln exhaust gases is regulated so that an economical and reliable combustion of the material delivered to the calcination zone is ensured. This procedure is particularly important in the drying of washed raw material in the production of cement, since here because of the large quantity of tertiary air the air temperatures are very low and thus the reduction in the temperature of the kiln exhaust gases would be too severe if all the tertiary air were mixed directly with the exhaust gases coming from the rotary kiln.

Apparatus for carrying out the method includes a rotary kiln having a downstream cooler, a preheater located upstream from the rotary kiln as regards the direction of movement of the material, and a precalciner located between the preheater and the rotary kiln. An inlet chamber associated with the material inlet end of the rotary kiln is connected via a tertiary air pipe to the cooler and via an exhaust gas pipe to the precalciner. The tertiary air pipe has a first branch connected to the inlet chamber of the rotary kiln, a second branch leading to the precalciner, and an adjustable throttle for the division of the tertiary air for the inlet chamber on the one hand and the precalciner on the other hand.

Apparatus according to the invention can be of extremely simple construction.

DESCRIPTION OF THE DRAWINGS

Further details and advantages of the invention are set out in the following description and illustrated in the accompanying drawings in which.

DETAILED DESCRIPTION

Figure 1:
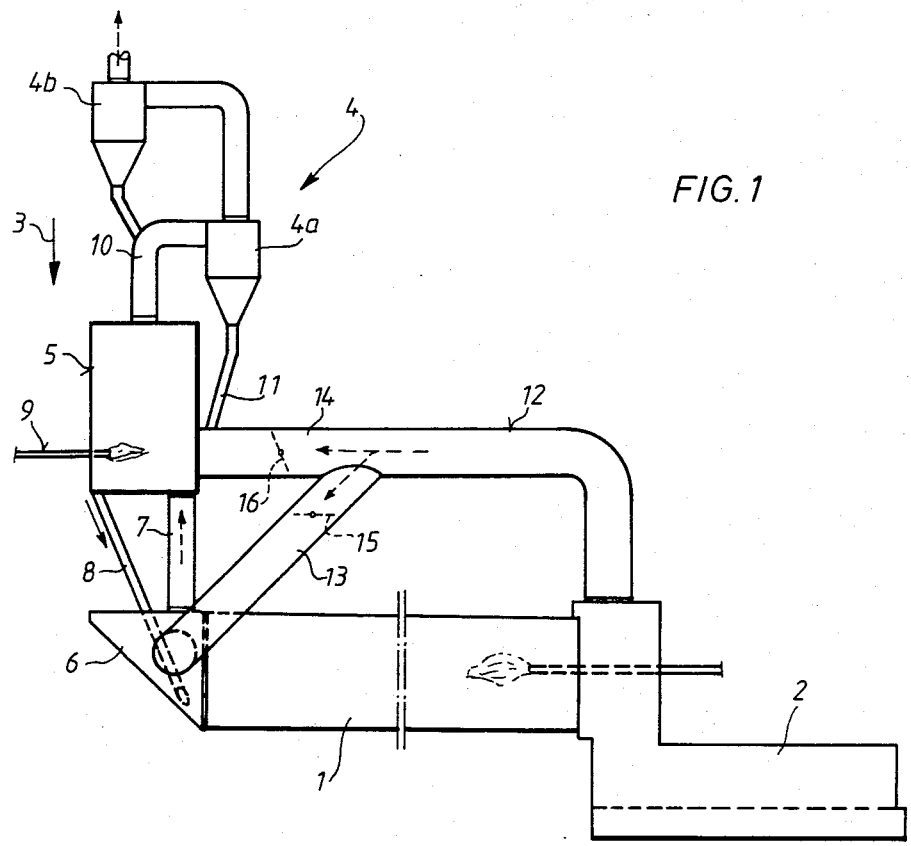
FIG. 1 is a quite schematic overall view of apparatus for carrying out the method according to the invention.

The apparatus contains a rotary kiln 1, a cooler 2 of conventional construction arranged downstream from the rotary kiln, a preheater 4 located upstream the rotary kiln 1, as regards the general direction of movement (arrow 3) of the fine material, and a precalciner 5 arranged between the preheater 4 and the rotary kiln 1.

Because the precalciner 5 is upstream from the kiln 1, it is relieved of a large part of the calcination operation for the fine material (especially crude cement dust) and it is preferably constructed as a short rotary kiln having a length to diameter ratio of between about 8:1 to 10:1. This construction provides considerable structural advantages (e.g., the necessity of providing support roller stations). A stationary inlet chamber 6, which is connected at its upper end via an exhaust gas pipe 7 to the precalciner 5, is associated with the material inlet end of the rotary kiln 1; in addition a material pipe 8 leads from the precalciner 5 into the inlet chamber 6, and preferably opens into the lower part thereof.

The precalciner 5 forming the precalcination zone can be constructed in a conventional manner with a delivery pipe 9 for additional combustion material or fuel. The preheater 4 arranged above the precalciner 5 can also be of conventional construction, but a multistage cyclone preheater is preferred, only the two lowest cyclone stages 4a, 4b of which are shown in FIG. 1.

The precalciner is connected to the preheater 4, or the lowest cyclone stage 4a thereof, directly via a precalcination exhaust gas pipe 10 and indirectly by a material pipe 11.

From the cooler 2 a tertiary air pipe 12 leads into the region of the rotary kiln inlet chamber 6/precalciner 5. This tertiary air pipe 12 is divided into two branches 13 and 14 of which the first branch 13 communicates directly with the inlet chamber 6 of the rotary kiln 1 and the second branch 14 communicates directly with the precalciner 5. Adjustable throttle valves 15 and 16 are arranged in the two branch pipes 13 and 14, respectively, so that the quantity of tertiary air can be distributed on the one hand to the inlet chamber 6 and on the other hand to the precalciner 5.

Figure 2:
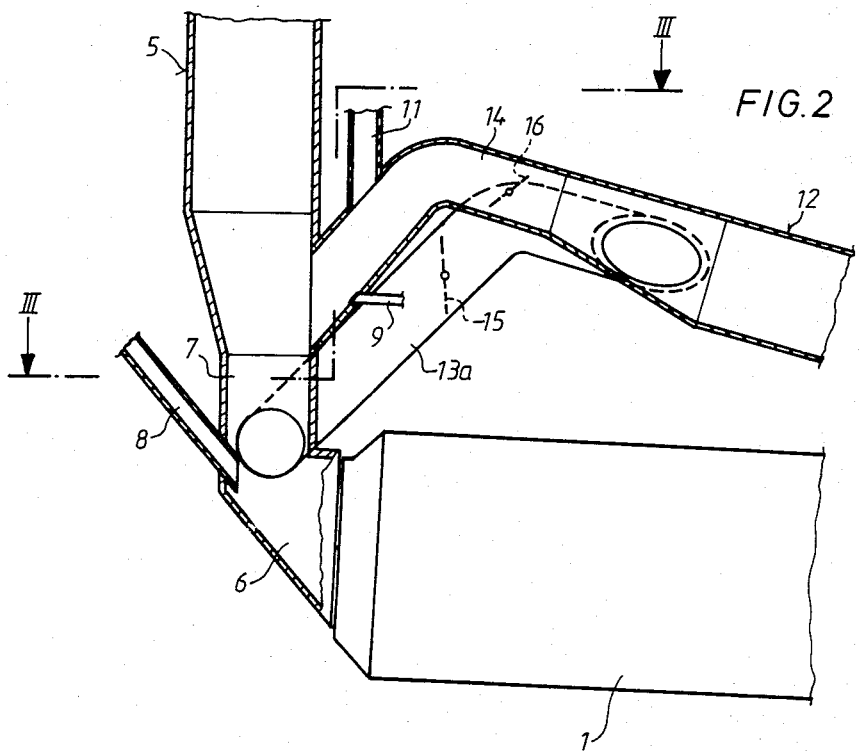
FIG. 2 is a simplified vertical sectional view in the region of the inlet end of the rotary kiln.
Figure 3:
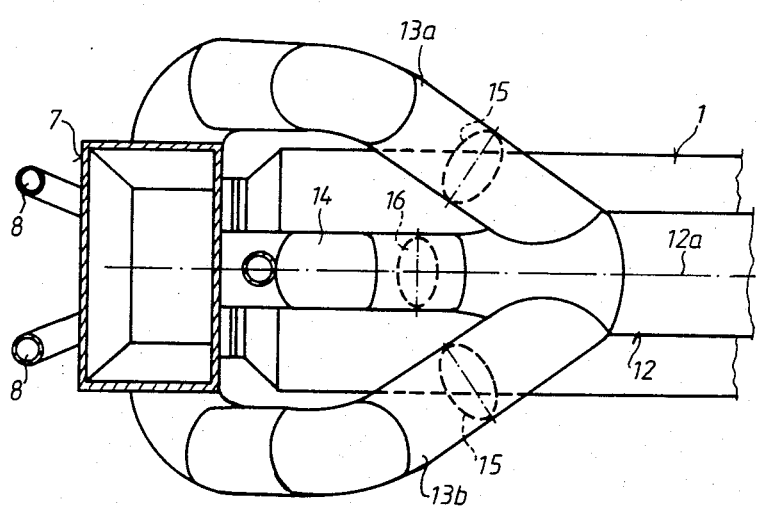
FIG. 3 is a partial plan projection approximately along the line III—III in FIG. 2.

The arrangement and construction of the tertiary air pipe 12 are shown in greater detail in FIGS. 2 and 3. In general, it is of course possible for the first branch 13 which leads to the inlet chamber 6 to be constructed as a simple pipe. However, it is preferred to divide the first tertiary air branch 13 into a pluralty of, preferably two, subsidiary branches 13a, 13b. These two subsidiary branches 13a, 13b are conveniently arranged, as best shown in plan projection (FIG. 3), symmetrically on both sides of the second tertiary air branch 14 which lies with its axis approximately in the vertical longitudinal median plane 12a of the tertiary air pipe 12. It is particularly favorable for the mixing of tertiary air and kiln exhaust gases if the subsidiary branches 13a, 13b open into the inlet chamber 6 of the rotary kiln 1 on opposing sides (cf. FIG. 3). With this division of the first tertiary air branch 13 a throttle valve 15 is associated with each subsidiary branch pipe 13a, 13b.

In order to ensure that the smallest possible quantity of precalcined material is carried out of the inlet chamber 6 with the mixture of kiln exhaust gases and tertiary air, the two subsidiary branches 13a, 13b of the first tertiary air branch 13 can open into the inlet chamber 6 in a region which lies above the connection point for the material pipe 8 (cf. FIGS. 1 and 2).

It can also be advantageous for the calcination or precalcination of the material preheated in the preheater 4 if the material pipe 11 coming from the cyclone preheater 4 opens into the second tertiary air branch 14 shortly before the precalciner 5 so that the proportion of tertiary air located therein is already mixed with the preheated material before it comes into contact with the combustion material delivered at 9.

Thus, in the apparatus described above it is possible in an extremely favorable manner to divide the tertiary air flowing in the tertiary air pipe 12 from the cooler 2 into two streams of which the first stream (in the first branch 13) is mixed together in the inlet chamber 6 with the kiln exhaust gases immediately after they escape from the rotary kiln 1, while the second stream is led through the second branch 14 directly into the calcination zone inside the precalciner 5. The throttle valves 15, 16 provided in the branches 13 and 14 permit an accurate regulation in particular of the first stream of tertiary air led into the inlet chamber 6 in such a way that by mixing this stream with the kiln exhaust gases the temperature of the mixed gases can be maintained at approximately 1000° C. The division of the first branch 13 into subsidiary branches and the provision of throttle valves 15 in each subsidiary branch 13a,13b also permit an extremely favorable adjustment of the subsidiary streams to each other and a favorable means of influencing the mixing inside the inlet chamber 6.

Figure 4:
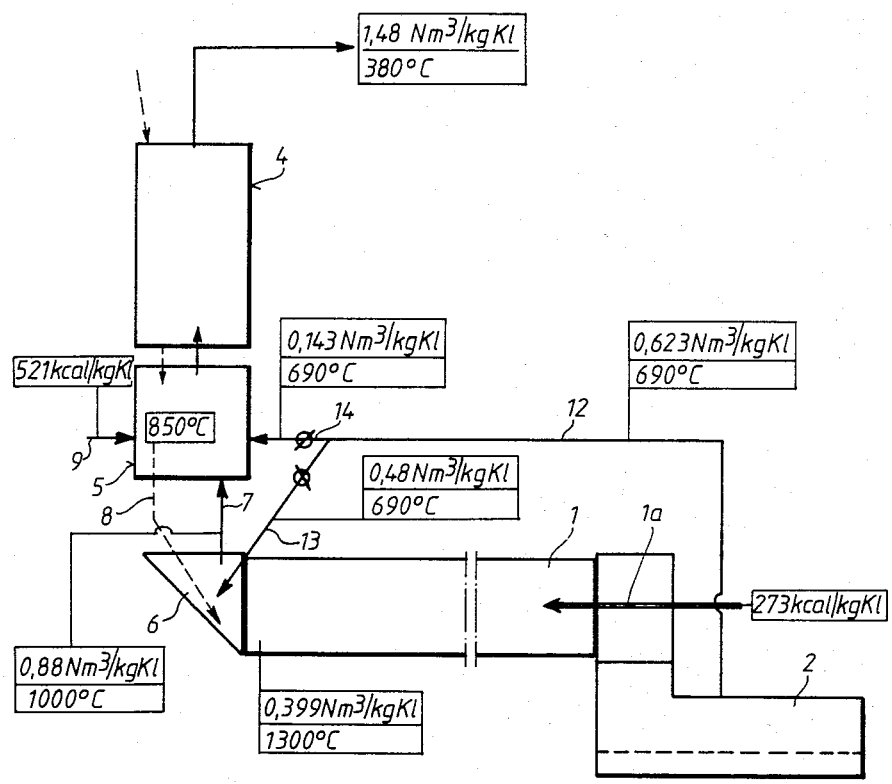
FIG. 4 is a further simplified schematic view of the whole apparatus with operational data to explain a working example of the apparatus.

A working example will be described with the aid of FIG. 4 and illustrating the gas temperatures and the quantities in different parts or regions of the apparatus.

Approximately 273 kcal/kg clinker (k1 denotes clinker) are delivered via a burner 1a to to the rotary kiln 1 which operates on the counterflow principle. At the inlet end adjacent the inlet chamber 6 the escaping kiln exhaust gases have a temperature of approximately 1300° C. and a quantity of air amounting to 0.399 $Nm^3$/kg clinker is present at or enters the inlet chamber 6. With the aid of the tertiary air pipe 12 approximately 0.623 $Nm^3$/kg clinker is extracted from the cooler at approximately 690° C. This tertiary air is divided so that approximately 0.143 $Nm^3$/kg clinker are delivered to the precalcinator 5, while the other stream with approximately 0.48 $Nm^3$/kg clinker is led directly to the inlet chamber 6 via the first branch 13 (i.e., the subsidiary branches 13a, 13b thereof). These streams also have a temperature of approximately 690° C., and the first stream is led into the inlet chamber 6 at a speed of approximately 30 m/s. After this first stream has been mixed with the kiln exhaust gases inside the inlet chamber 6 the mixed gases thus obtained should have a temperature of approximately 1000° C. The mixed gases are then delivered via the kiln exhaust gas pipe 7 to the precalcinator 5 in a quantity of 0.88 $Nm^2$/kg clinker. In addition the precalcinator 5 receives suitable liquid, gaseous, or fine-grained combustion material for 521 kcal/kg clinker, so that in the precalcinator 5 a degree of deacidification of at least 90° C. is provided for the fine material and the material temperature is maintained at approximately 850° C. The exhaust gases leaving the precalcinater 5 are utilized in a conventional manner in the cyclone preheater 4 for preheating of the fine material, and the exhaust gases leave the preheater 4 at a temperature of approximately 380° C. and in a quantity of 1.48 $Nm^3$/kg clinker.

I claim:

1. In a method for the heat treatment of fine-grained material wherein such material is preheated in a preheating zone, then precalcined in a precalcining zone, and then delivered to a sintering zone the exhaust gases of which flow in a single stream to said precalcining zone and thence to said preheating zone, said material being delivered from said sintering zone to a cooling zone from which tertiary air is discharged, the improvement comprising dividing said tertiary air into two branches; mixing the air of one of said branches with said stream of exhaust gases in a region between said sintering zone and said precalcining zone; and introducing the air of the other of said branches directly into said precalcining zone.

2. The method according to claim 1 including dividing said one of said air streams into two subsidiary streams that are mixed with said exhaust gases at spaced apart points.

3. The method according to claim 2 wherein said points are opposite one another.

4. The method according to claim 1 including adjusting the quantities of said air in said streams to maintain the temperature of said exhaust gases delivered to said precalcining zone at a selected value.

5. The method according to claim 4 wherein said value is about 1,000° C.

6. In apparatus for heat treating fine-grained material wherein such material passes through a preheater, then through a precalciner, then through a sintering kiln, and then through a cooler containing tertiary air, and wherein exhaust gases from said kiln are delivered in a single stream via an exhaust gas duct means to said precalciner, the improvement comprising conduit means in communication with said cooler for receiving said teritary air, said conduit means having a first branch in communication with said exhaust gas duct means between said kiln and said precalciner for delivering to said exhaust gas duct means a first portion of said tertiary air, said conduit means having a second branch in communication with said precalciner for delivering another portion of said tertiary air to said precalciner.

7. Apparatus according to claim 6 wherein said exhaust duct means comprises a housing adjacent said kiln and a pipe communicating between said housing and said precalciner, said first branch of said conduit means communicating with said housing.

8. Apparatus according to claim 7 wherein said first branch is divided into two subsidiary branches which communicate with said housing at different points.

9. Apparatus according to claim 8 wherein said subsidiary branches communicate with said housing at opposite sides thereof.

10. Apparatus according to claim 8 including throttle valve means in each of said subsidiary branches for regulating the quantity of said tertiary air that may flow therethrough.

11. Apparatus according to claim 6 including throttle valve means in each of said first and second branches for regulating the quantity of said tertiary air that may flow therethrough.

12. Apparatus according to claim 6 wherein a material delivery pipe communicates between said precalciner and said exhaust gas duct means, said first branch communicating with said duct means at a level above that at which said material delivery pipe communicates with said duct means.

13. Apparatus according to claim 6 wherein material passing through said preheater is discharged through a material pipe, said pipe being in communication with said second branch of said conduit means.

14. Apparatus according to claim 13 wherein said pipe communicates with said second branch closely adjacent said precalciner.

15. Apparatus according to claim 6 wherein said kiln has a length to diameter ratio of between about 8:1 and 10:1.

* * * * *